United States Patent
Bae (10) Patent No.: US 12,151,311 B2
(45) Date of Patent: Nov. 26, 2024

(54) FILM CUTTING APPARATUS (71) Applicant: NPS CO., LTD., Cheongju-si (KR)

(72) Inventor: Seong Ho Bae, Daejeon (KR)

(73) Assignee: NPS CO., LTD., Cheongju-si (KR)

( * ) Notice: Subject to any disclaimer, the term of this patent is extended or adjusted under 35 U.S.C. 154(b) by 0 days.

(21) Appl. No.: 17/395,737

(22) Filed: Aug. 6, 2021

(65) Prior Publication Data
US 2022/0203478 A1 Jun. 30, 2022

(30) Foreign Application Priority Data

Dec. 24, 2020 (KR) .......................... 10-2020-0182731
Jan. 15, 2021 (KR) .......................... 10-2021-0006279

(51) Int. Cl.
*B23K 26/364* (2014.01)
*B23K 26/02* (2014.01)
*B23K 26/38* (2014.01)
*B23K 37/04* (2006.01)
*B23K 103/00* (2006.01)
*B23K 103/16* (2006.01)

(52) U.S. Cl.
CPC ............ *B23K 26/364* (2015.10); *B23K 26/02* (2013.01); *B23K 26/38* (2013.01); *B23K 37/0408* (2013.01); *B23K 2103/172* (2018.08); *B23K 2103/38* (2018.08)

(58) Field of Classification Search
CPC ...... B23K 26/364; B23K 26/02; B23K 26/38; B23K 37/0408; B23K 2103/172; B23K 2103/38; B23K 2101/16; B23K 2103/42; B23K 26/0846; B23K 26/402; B23K 26/0604
See application file for complete search history.

(56) References Cited

U.S. PATENT DOCUMENTS

2017/0135393 A1* 5/2017 Ademe .................... A24C 5/36
2021/0178742 A1* 6/2021 Lee ......................... G02B 27/01

FOREIGN PATENT DOCUMENTS

| JP | 2010188411 A | * | 9/2010 | |
| JP | 2015199801 A | * | 11/2015 | |
| WO | WO-2011118316 A1 | * | 9/2011 | ......... B23K 26/0846 |

* cited by examiner

Primary Examiner — Janie M Loeppke
Assistant Examiner — Theodore J Evangelista
(74) Attorney, Agent, or Firm — NKL Law; Jae Youn Kim (57) ABSTRACT

Disclosed is a film cutting apparatus for cutting a film fabric having a multilayer structure with a plurality of film layers and including a release film layer positioned at an outermost layer of one side of the film layers, the film cutting apparatus including a laser unit including a laser head configured to form a first cutting line on a predetermined first film group by cutting the first film group by selectively irradiating the first film group with a laser beam to include some film layers except for the release film layer among the film layers, and a cutting unit including a cutter configured to form a single cutting line by connecting a second cutting line and the first cutting line on a predetermined second film group by cutting the second film group using a cutting blade to include some film layers including at least the release film layer among the film layers.

4 Claims, 9 Drawing Sheets

FIG. 1

Prior Art

FILM CUTTING APPARATUS

CROSS-REFERENCE TO RELATED APPLICATION

This application claims priority to and the benefit of Korean Patent Application No. 10-2020-0182731, filed on Dec. 24, 2020, and Korean Patent Application No. 10-2021-0006279, filed on Jan. 15, 2021, the disclosure of which is incorporated herein by reference in its entirety.

BACKGROUND

1. Technical Field

The present invention relates to a film cutting apparatus for cutting and processing a film.

2. Description of the Related Art

A cathode ray tube (CRT), which is one of conventionally used display devices, has been mainly used in a monitor such as a TV, a measuring device, and an information terminal device, but due to the large weight or size of the CRT itself, it is not possible to actively respond to demand for miniaturization and weight reduction of electronic products.

In order to replace the CRT, a liquid crystal display device with advantages of small size and light weight has been actively developed, and recently, has been developed to sufficiently function as a flat panel display device, and demand for the CRT has gradually increased.

An image realization principle of the liquid crystal display is to use the optical anisotropy and polarization properties of liquid crystal, and the liquid crystal includes a thin and long molecular structure, and has anisotropy having directionality in molecular arrangement and polarization properties in which a direction of the molecular arrangement changes depending on the size of an electric field when placed in the electric field. Thus, the liquid crystal display includes, as a required component, a liquid crystal panel including a pair of transparent insulating substrates, which face each other and have respective electric field generating electrodes, and a liquid crystal layer interposed between the transparent insulating substrates, and displays various images using light transmittance that is changed when a direction of alignment of liquid crystal molecules is artificially adjusted through a change in an electric field between the electric field generating electrodes.

In this case, polarizing films for visualizing a change in orientation of liquid crystal of the liquid crystal display are disposed above and below the liquid crystal panel, respectively and transmit a polarized component of light that coincides with a transmission axis, and accordingly, a degree of transmittance of light is determined depending on arrangement of transmission axes of the two polarizing films and the characteristics of arrangement of the liquid crystal.

Figure 1:
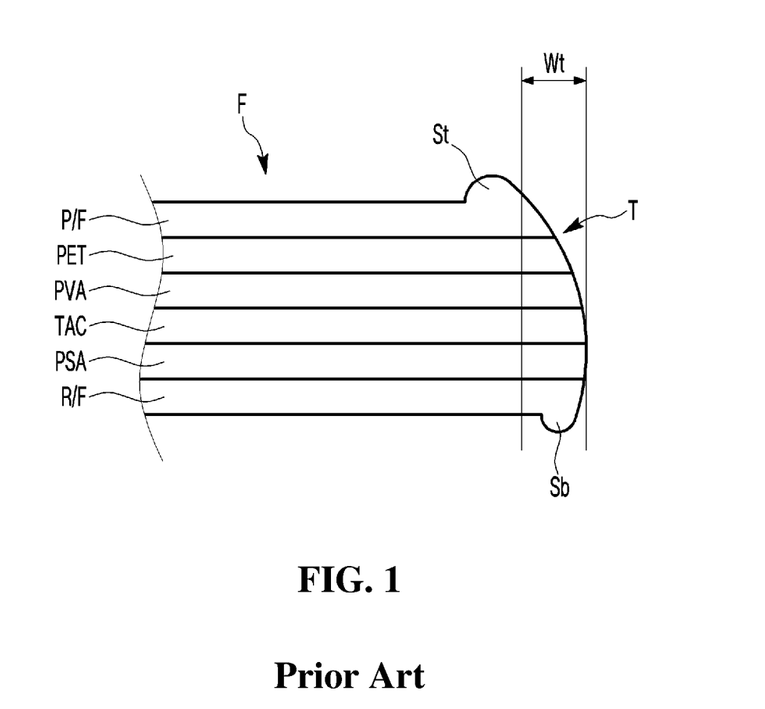
FIG. 1 is a diagram showing a laser facet of a general polarizing film.

FIG. 1 is a diagram showing a laser facet of a general polarizing film.

In general, a protective film layer P/F may be stacked on one end of the polarizing film, and a release film layer R/F may be stacked on an opposite end of the polarizing film, opposite to the one end. In particular, the release film layer R/F may be detachably attached to a pressure sensitive adhesive layer PSA formed by applying an adhesive to a transmittance enhancement layer TAC.

In general, when the polarizing film is cut using a laser beam, the polarizing film is thermally deformed by heat applied from the laser beam, and thus, shoulders St and Sb may protrude from a heat affected zone of the protective film layer P/F and a heat affected zone of the release film layer R/F, which are positioned at both ends of the polarizing film, respectively, and a facet of the polarizing film may constitute a taper face T having a predetermined taper width Wt.

When a polarizing film product manufactured through laser cutting of a polarizing film depending on the size of a liquid crystal panel is attached to a liquid crystal panel, the polarizing film product is attached to the liquid crystal panel using the pressure sensitive adhesive layer PSA that is externally exposed by peeling the release film layer R/F in the state in which an edge of the release film layer R/F is detected via vision inspection and then the polarizing film product is aligned based on the position of the edge of the release film layer R/F. Thus, when the polarizing film product manufactured through laser cutting of the polarizing film is attached to the liquid crystal panel, errors frequently occurs as the result of inspection of the edge of the release film layer R/F due to the shoulder Sb and the taper face T, and thus there is a problem in that it is difficult to attach the polarizing film product to the exact position of the liquid crystal panel.

SUMMARY

Therefore, the present invention has been made in view of the above problems, and it is an object of the present invention to provide a film cutting apparatus that is improved to prevent a shoulder from being formed on a release film layer.

It is another object of the present invention to provide a film cutting apparatus that is improved to minimize a taper width of a taper face.

In accordance with an aspect of the present invention, the above and other objects can be accomplished by the provision of a film cutting apparatus for cutting a film fabric having a multilayer structure with a plurality of film layers and including a release film layer positioned at an outermost layer of one side of the film layers, the film cutting apparatus including a laser unit including a laser head configured to form a first cutting line on a predetermined first film group by cutting the first film group by selectively irradiating the first film group with a laser beam to include some film layers except for the release film layer among the film layers, and a cutting unit including a cutter configured to form a single cutting line by connecting a second cutting line and the first cutting line on a predetermined second film group by cutting the second film group using a cutting blade to include some film layers including at least the release film layer among the film layers.

According to an aspect of the present invention, the first film group and the second film group may each include at least one film layer among the film layers.

According to another aspect of the present invention, the film cutting apparatus may further include a transferring unit configured to transfer the film fabric in a predetermined transferring direction, wherein the laser head may form the first cutting line in the transferring direction by radiating a laser beam onto the first film group of a film fabric passing through a predetermined first cutting point by the transferring unit, and the cutter may form the second cutting line in the transferring direction to make the cutting blade contact the second film group of a film fabric passing through a predetermined second cutting point by the transferring unit.

According to another aspect of the present invention, the second cutting point may be determined to be spaced apart from the first cutting point in the transferring direction by a predetermined distance.

According to another aspect of the present invention, the cutter may be configured in a shape of a disk having an outer circumference with the cutting blade formed thereon, and the cutter unit may further include a driving motor axially coupled to a rotation shaft of the cutter and configured to rotationally drive the cutter.

According to another aspect of the present invention, the cutter unit may further include an idle roller configured to support a film fabric passing through the second cutting point.

According to another aspect of the present invention, the cutting line may be formed to divide the film fabric into a processed fabric slit to have a predetermined width and scrap as a residue after the film fabric is slit, by a corresponding cutting line.

In accordance with another aspect of the present invention, there is provided a film cutting apparatus for cutting multiple films including a plurality of film layers, including a laser unit including a laser head configured to form a first cutting line on a first film group including some of the film layers by cutting the first film group by irradiating the first film group with a laser beam, and a cutter unit including a cutter configured to form a single cutting line by connecting a second cutting line and the first cutting line on a second film group including some of the film layers by cutting the second film group using a cutting blade.

Here, the first film group and the second film group may each include at least one film layer among the film layers.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION

Hereinafter, the embodiments of the present disclosure will be described in detail with reference to the attached drawings. Here, when reference numerals are applied to constituents illustrated in each drawing, it should be noted that like reference numerals indicate like elements throughout the specification. In addition, in the following description of the present disclosure, a detailed description of known functions and configurations incorporated herein will be omitted when it may make the subject matter of the present disclosure unclear.

In describing the components of the embodiments of the present disclosure, terms such as first, second, A, B, (a), and (b) may be used. These terms are used to distinguish each component from other components, and the nature or order of the components is not limited by these terms. In addition, unless defined otherwise, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
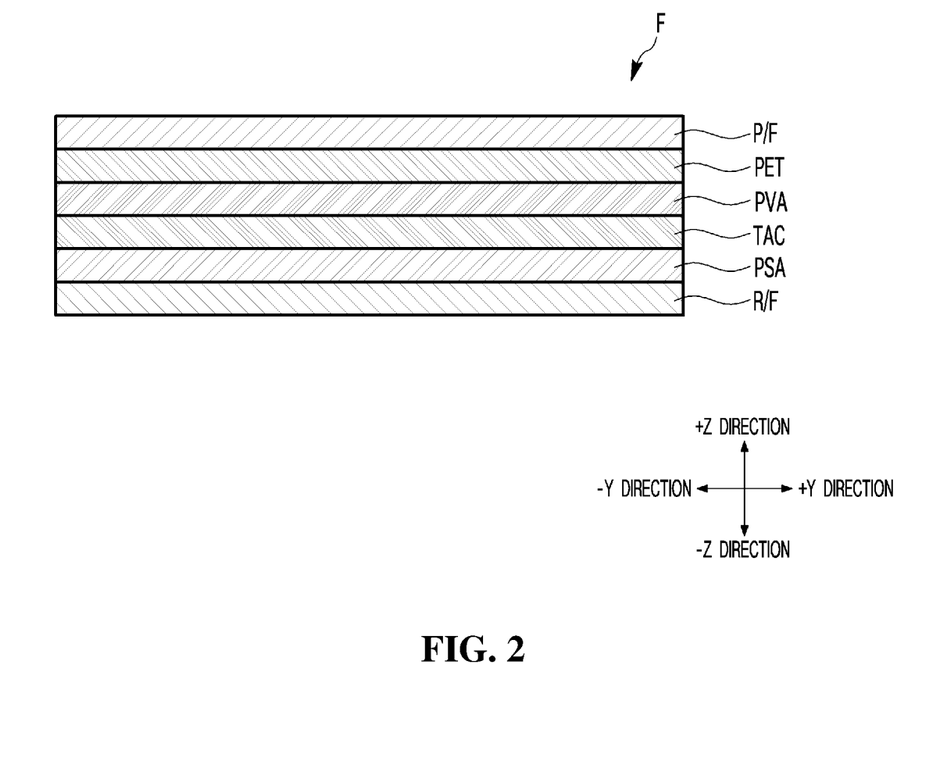
FIG. 2 is a diagram showing a multilayer structure of a film fabric.

FIG. 2 is a diagram showing a multilayer structure of a film fabric.

A film cutting apparatus 1 according to an embodiment of the present invention may be an apparatus for cutting a film fabric F having a multilayer structure. The type of the film fabric F that is capable of being cut using the film cutting apparatus 1 is not particularly limited. For example, the film fabric F may be a polarizing film fabric to be applied to the liquid crystal panel.

When the film fabric F is a polarizing film fabric, the film fabric F may include an active layer PVA, a transmittance enhancement layer TAC, a protective film layer P/F, and a release film layer R/F.

The active layer PVA may be a film layer for changing the polarization properties of light. A material of the active layer PVA is not particularly limited. For example, the active layer PVA may include at least polyvinyl alcohol.

The transmittance enhancement layer TAC may be a film layer for transmitting light from a light source toward a front side of a display as much as possible. A material of the transmittance enhancement layer TAC is not particularly limited. For example, the transmittance enhancement layer TAC may include at least triacetyl cellulose. As shown in FIG. 2, the transmittance enhancement layer TAC may be stacked on a lower surface of the active layer PVA, but the present invention is not limited thereto.

The protective film layer P/F may be a film layer for preventing the polarizing film from being damaged. A material of the protective film layer P/F is not particularly limited. For example, the protective film layer P/F may include at least one of polyethylene terephthalate (PET) or polyethylene (PE).

As shown in FIG. 2, the protective film layer P/F may be stacked on an upper surface of the active layer PVA with a PET layer PET interposed therebetween to be positioned on the outermost layer of one side of the film fabric F among film layers included in the film fabric F.

The release film layer R/F may be a film layer for isolating the adhesive layer for attaching the polarizing film to the liquid crystal panel from contaminants. A material of the release film layer R/F is not particularly limited. For example, the release film layer R/F may include at least one of polyethylene terephthalate (PET) or polyethylene (PE).

As shown in FIG. 2, the release film layer R/F may be releasably adhered to a pressure sensitive adhesive layer PSA formed by applying an adhesive to a lower surface of the transmittance enhancement layer TAC to be positioned on the outermost layer of the other side of the film fabric F among the film layers included in the film fabric F. The adhesive may be a pressure sensitive adhesive but is not limited thereto. When a polarizing film product formed cutting the film fabric F is attached to the liquid crystal panel, the release film layer R/F may be peeled from the pressure sensitive adhesive layer PSA to externally expose the pressure sensitive adhesive layer PSA and then the polarizing film product may be attached to the liquid crystal film using the pressure sensitive adhesive layer PSA.

Figure 3:
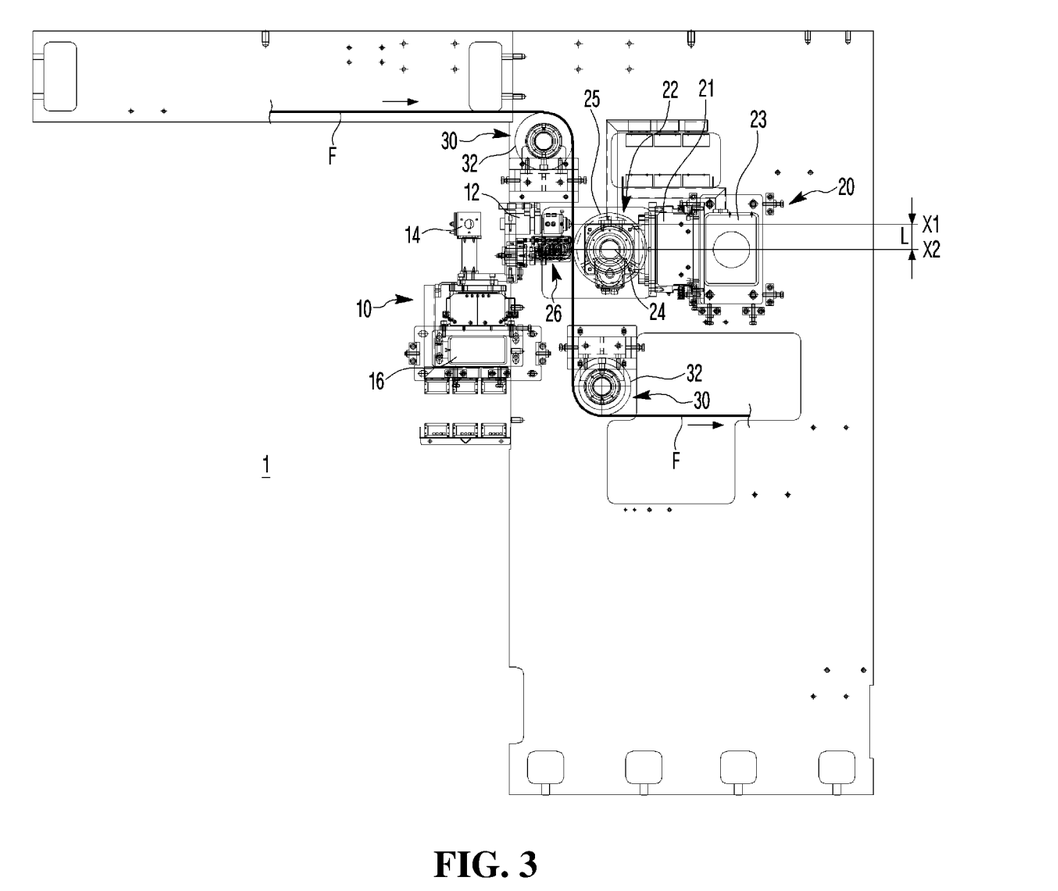
FIG. 3 is a schematic diagram showing the configuration of a film cutting apparatus according to an embodiment of the present invention.
Figure 4:
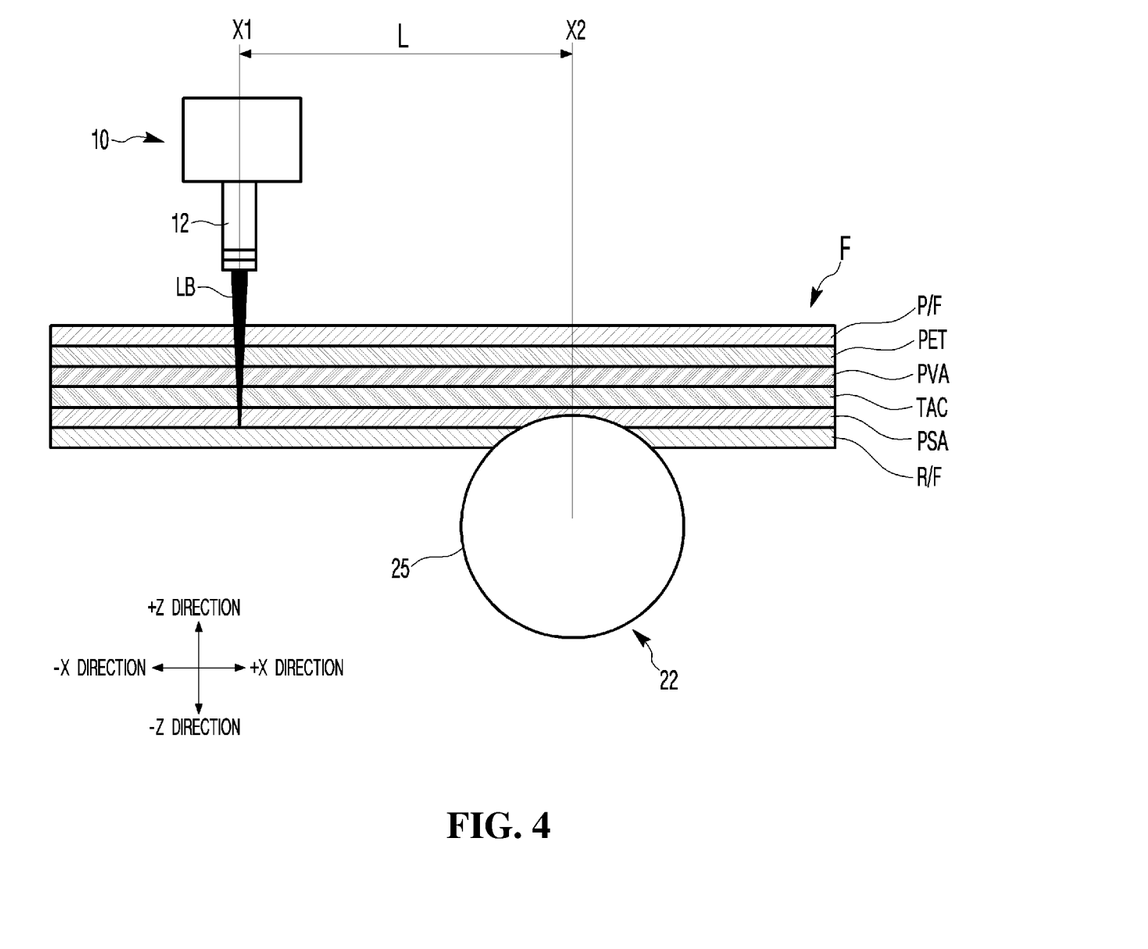
FIG. 4 is a cross-sectional view of a film fabric being cut by a laser beam and a cutter, which is viewed from a −Y direction.
Figure 5:
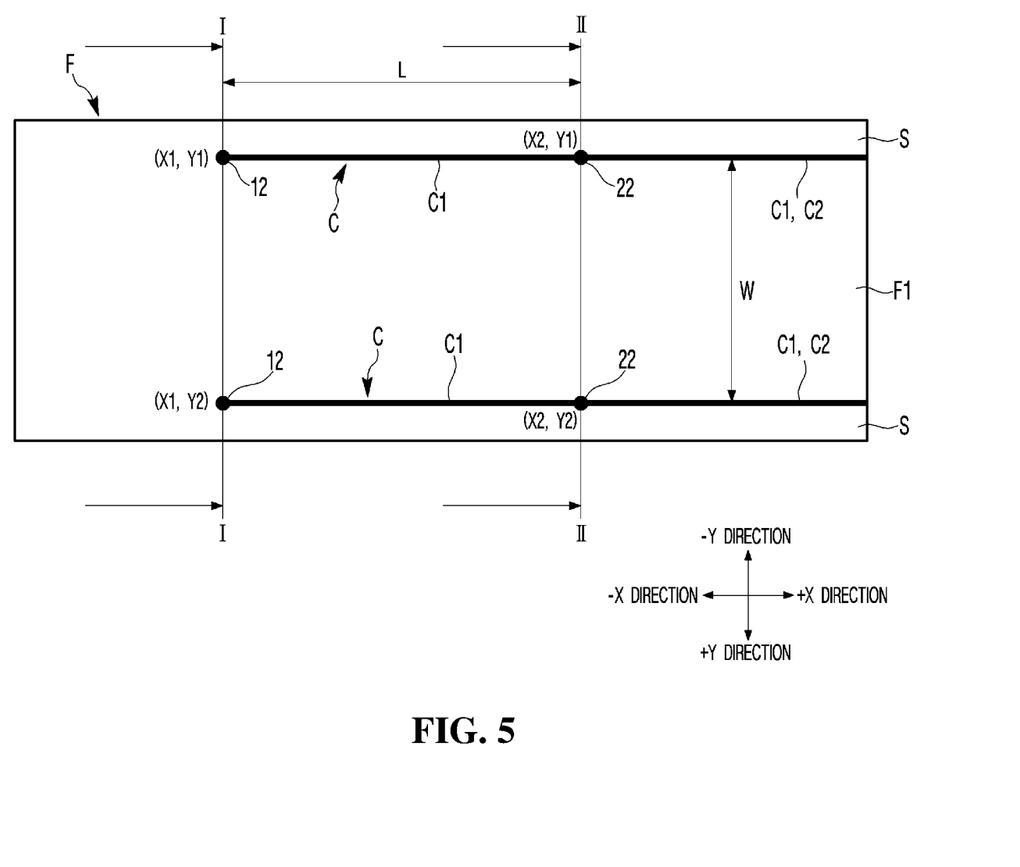
FIG. 5 is a plan view of a film fabric for explaining a method of cutting and processing a film fabric using the film cutting apparatus shown in FIG. 3.
Figure 6:
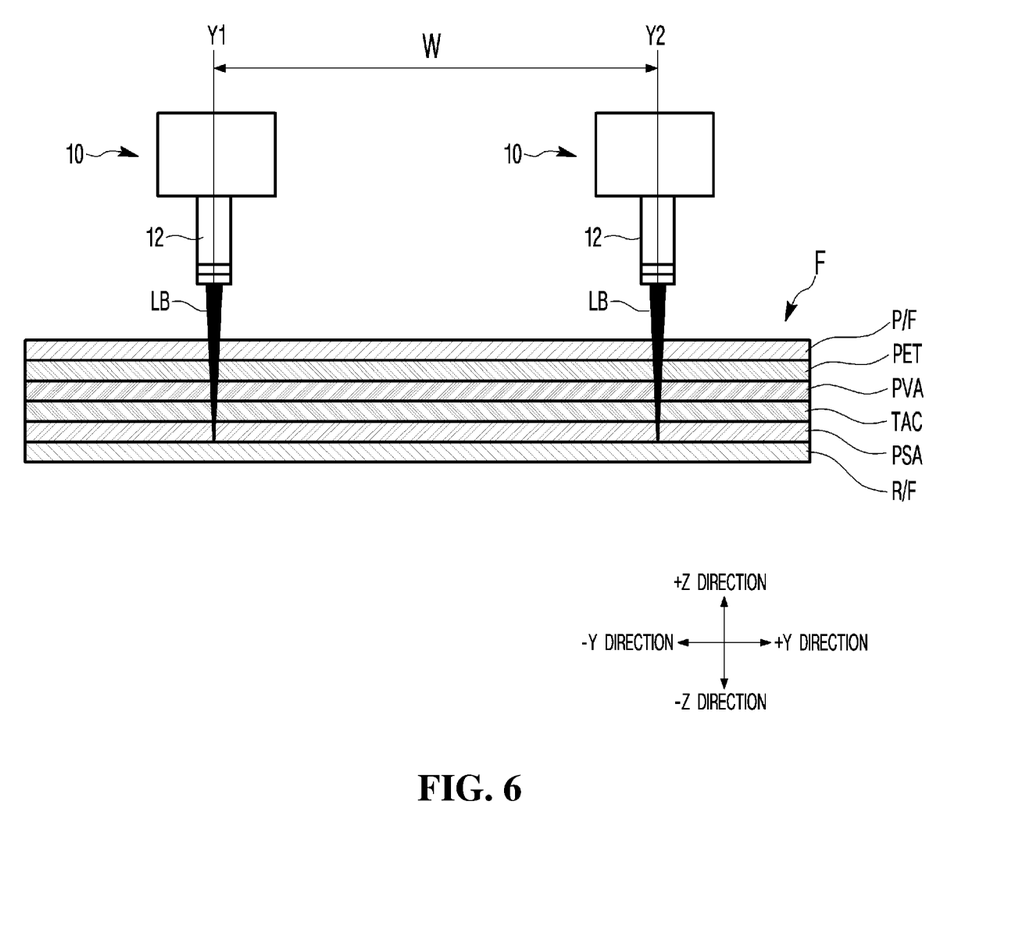
FIG. 6 is a cross-sectional view of a film fabric being primarily cut by a laser beam, which is taken along a line I-I of FIG. 5 and is viewed from a −X direction.
Figure 7:
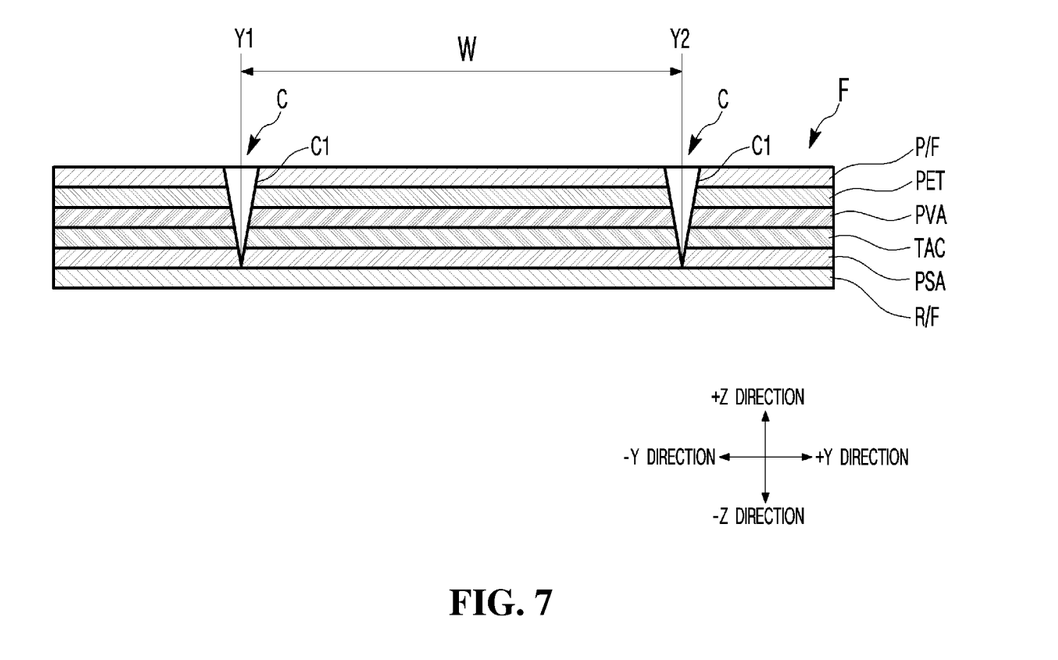
FIG. 7 is a cross-sectional view showing the state in which a first cutting line is formed on a film fabric by a laser beam, which is taken along a line I-I of FIG. 5 and is viewed from a −X direction.
Figure 8:
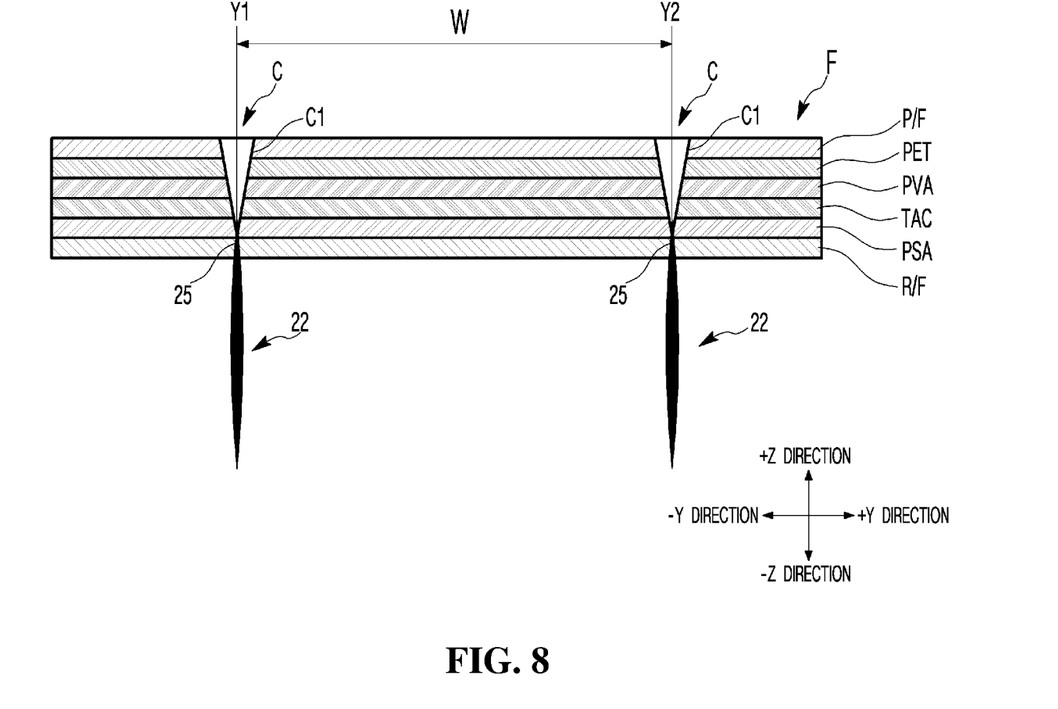
FIG. 8 is a cross-sectional view of a film fabric being secondarily cut by a cutter, which is taken along a line II-II of FIG. 5 and is viewed from a −X direction.
Figure 9:
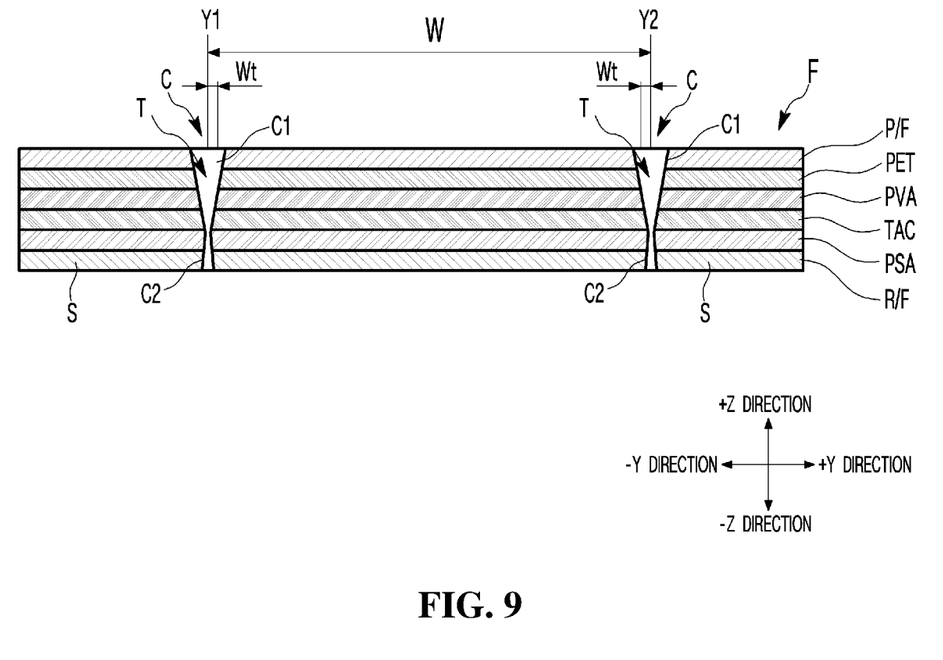
FIG. 9 is a cross-sectional view showing the state in which a second cutting line is formed in a film fabric by a cutter, which is taken along a line II-II of FIG. 5 and is viewed from a −X direction.

FIG. 3 is a schematic diagram showing the configuration of a film cutting apparatus according to an embodiment of the present invention. FIG. 4 is a cross-sectional view of a film fabric being cut by a laser beam and a cutter, which is viewed from a −Y direction. FIG. 5 is a plan view of a film fabric for explaining a method of cutting and processing a film fabric using the film cutting apparatus shown in FIG. 3. FIG. 6 is a cross-sectional view of a film fabric being primarily cut by a laser beam, which is taken along a line I-I of FIG. 5 and is viewed from a −X direction. FIG. 7 is a cross-sectional view showing the state in which a first cutting line is formed on a film fabric by a laser beam, which is taken along a line I-I of FIG. 5 and is viewed from a −X direction. FIG. 8 is a cross-sectional view of a film fabric being secondarily cut by a cutter, which is taken along a line II-II of FIG. 5 and is viewed from a −X direction. FIG. 9 is a cross-sectional view showing the state in which a second cutting line is formed in a film fabric by a cutter, which is taken along a line II-II of FIG. 5 and is viewed from a −X direction.

Referring to FIG. 3, the film fabric F may be unwound and supplied from a supply roll (not shown) around which the film fabric F is wound in a roll state and may be transferred in a predetermined transferring direction of the film fabric F along a predetermined roll path by a transferring unit 30 including transferring rollers 32. For example, the film fabric F may be transferred in a longitudinal direction (hereinafter referred to as an X direction) of the film fabric F, but the present invention is not limited thereto.

Referring to FIGS. 3 and 4, the film cutting apparatus 1 may include a laser unit 10 for cutting a predetermined first film group among all film layers of the film fabric F in the X direction using a laser beam LB, and a cutter unit 20 for cutting a predetermined second film group among all the film layers of the film fabric F of the film fabric F in the X direction using a cutter 22.

As shown in FIG. 3, the laser unit 10 may include a laser oscillator (not shown) for generating and oscillating the laser beam LB, a laser head 12 for irradiating the film fabric F with the laser beam LB oscillated from the laser oscillator to selectively laser-cut the first film group of the film fabric F, and a head driver 16 for moving the laser head 12 in at least one direction of the X direction and a width direction (hereinafter referred to as a Y direction) of the film fabric F, perpendicular to the X direction. At least one reflection mirror 14 for reflecting the laser beam LB oscillated from the laser oscillator and transferring the laser beam LB to the laser head 12 may be installed between the laser oscillator and the laser head 12.

As shown in FIG. 4, the laser head 12 may be installed to be spaced apart from an upper surface of the film fabric F by a predetermined interval in a thickness direction (hereinafter referred to as a Z direction) to irradiate the upper surface of the film fabric F with the laser beam LB.

The first film group may include some film layers except for the release film layer R/F among all the film layers of the film fabric F. That is, the first film group may be determined to prevent the release film layer R/F from being cut by the laser beam LB. For example, the first film group may include the protective film layer P/F, the PET layer PET, the active layer PVA, the transmittance enhancement layer TAC, and the pressure sensitive adhesive layer PSA. In this case, driving factors of the laser unit 10 for adjusting a laser cutting condition of the first film group, such as output of the laser oscillator and a distance between the laser head 12 and an upper surface of the protective film layer P/F, may be adjusted to laser-cut the protective film layer P/F to the pressure sensitive adhesive layer PSA by the laser beam LB incident on the upper surface of the film fabric F, that is, the upper surface of the protective film layer P/F.

The number of the installed laser heads 12 is not particularly limited. For example, as shown in FIG. 5, a pair of laser heads 12 may be installed to form a pair of cutting lines C on the film fabric F in the X direction. In this case, the head driver 16 may position the laser heads 12 to radiate the laser beam LB onto the film fabric F that reaches a predetermined first cutting point X1 and to be spaced apart from each other by a vertical width W of a polarizing film product to be manufactured by cutting the film fabric F.

As such, in the state in which the laser heads 12 are positioned, when the film fabric F is transferred in the X direction using the transferring unit 30 and simultaneously the laser oscillator is driven, the laser heads 12 may radiate the laser beam LB to a processing point of the upper surface of the film fabric F, which passes through the first cutting point X1 to face the corresponding laser head 12, to selectively cut the first film group in the X direction, as shown in FIGS. 5 and 6. Accordingly, as shown in FIG. 7, a pair of first cutting lines C1 may be formed on the first film group in the X direction while being spaced apart from each other in the Y direction by the vertical width W of the polarizing film product.

As shown in FIG. 3, the cutter unit 20 may include a driving motor 21, the cutter 22 rotationally driven by the driving motor 21, and a cutter driver 23 for transferring the driving motor 21 and the cutter 22 coupled thereto in at least one direction of the X direction, the Y direction, or the Z direction.

The cutter 22 may be configured in a shape of a disk having a predetermined diameter. The cutter 22 may include a rotation shaft 24 axially coupled to the driving motor 21, and a cutting blade 25 formed on an outer circumference to selectively cut the second film group of the film fabric F.

As shown in FIG. 4, the cutter 22 may be installed and may make the cutting blade 25 contact a lower surface of the film fabric F, that is, a lower surface of the release film layer R/F to selectively cut the second film group while the cutting blade 25 is inserted into the film fabric F in a +Z direction by a depth corresponding to the thickness of the second film group.

The second film group may include some film layers including at least the release film layer R/F among all the film layers of the film fabric F. Here, the first film group and the second film group may be determined to each include at least one film layer except for the release film layer R/F to cut the release film layer R/F of all the film layers of the film fabric F only by the cutter 22 and to redundantly cut the at least one film layer except for the release film layer R/F by the laser beam LB and the cutter 22. For example, the second film group may include the release film layer R/F and the pressure sensitive adhesive layer PSA to redundantly cut the pressure sensitive adhesive layer PSA, which is positioned closest to the release film layer R/F among the film layers included in the first film group, by the laser beam LB and the cutter 22. In this case, as shown in FIG. 4, the cutter driver 23 may position the cutter 22 to insert the cutting blade 25 into the pressure sensitive adhesive layer PSA only to a predetermine depth, but the present invention is not limited thereto.

The number of the installed cutters 22 is not particularly limited. For example, as shown in FIG. 5, a pair of cutters 22 may be installed to form the pair of cutting lines C in the X direction. In this case, the cutter driver 23 may position the cutters 22 to cut the second film group of the film fabric F that reaches a predetermined second cutting point X2. The cutter driver 23 may position the cutters 22 to be spaced apart from each other by the vertical width W of the film fabric F, and here, Y coordinates (Y1, Y2) of the cutters 22 and Y coordinates (Y1, Y2) of the laser heads 12 may be the same. That is, each of the cutters 22 may have the same Y coordinates as any one of the laser heads 12. Here, the second cutting point X2 may be set to be spaced apart from the first cutting point X1 in the +X direction by a predetermined distance L to prevent the laser beam LB passing through the first film group from meeting the cutter 22.

As such, in the state in which the cutters 22 are positioned, when the film fabric F is transferred in the +X direction using the transferring unit 30 and simultaneously the cutters 22 are rotationally driven, the cutters 22 may selectively cut the film fabric F, which passes through the second cutting point X2 to face the cutting blade 25 of the corresponding cutter 22, by a depth corresponding to the thickness of the second film group, as shown in FIGS. 5 and 8. Accordingly, as shown in FIG. 9, a pair of second cutting lines C2 may be formed on the second film group in the X direction while being spaced apart from each other in the Y direction by the vertical width W of the polarizing film product.

As shown in FIG. 3, when the second film group is cut by the cutters 22, the cutter unit 20 may further include at least one idle roller 26 for supporting one region of the film fabric F passing through the second cutting point X2 to prevent the film fabric F from vibrating. The idle roller 26 may be installed at an opposite side to the cutters 22 based on the film fabric F. For example, when the cutters 22 are installed to contact a lower surface of one region of the film fabric F, the idle roller 26 may be installed to pressurize and support an upper surface of one region of the film fabric F. The idle roller 26 may be installed to be spaced apart from the cutters 22 in the Y direction by a predetermined distance not to interfere with the cutters 22.

As described above, the laser heads 12 and the cutters 22 may be arranged to have the same Y coordinates, and the first film group and the second film group may be set to commonly include the pressure sensitive adhesive layer PSA. Thus, as shown in FIG. 9, the first cutting line C1 and the second cutting line C2 may be connected to each other in the Z direction to form a cutting line C that divides the film fabric F into both sides in the X direction. Accordingly, as shown in FIG. 9, the pair of cutting lines C each including the first cutting line C1 and the second cutting line C2 are formed in the X direction on the film fabric F while being spaced apart from each other in the Y direction by the vertical width W of the polarizing film product, and the film fabric F may be divided into a processed fabric F1 that is slit to have a width corresponding to the vertical width W of the polarizing film product, and scraps S that are residues after the film fabric F is slit along the cutting lines C.

In general, when a cutting object is cut using a cutter including a cutting blade, the amount of heat applied to the cutting object is reduced compared with the case in which the cutting object is cut using a laser beam, and accordingly, a facet of the cutting object, that is, a taper width of a taper face may be reduced, and a shoulder due to thermal deformation of the cutting object may not be formed at a region adjacent to the facet of the cutting object.

However, the film cutting apparatus 1 may be provided to cut the first film group except for at least the release film layer R/F among all the film layers included in the film fabric F using the laser beam LB and the cutter 22 multiply and to cut the second film group including at least the release film layer R/F using the cutter 22. When the film cutting apparatus 1 is used, most film layers included in the film fabric F may be cut using the laser beam LB having excellent physical properties, and in this case, the release film layer R/F may be cut using the cutter 22 to prevent a shoulder from being formed due to thermal deformation in a region adjacent to a facet. When the release film layer R/F is selectively cut using the cutter 22, the taper width Wt of the facet of the film fabric F, that is, the taper face T may be reduced compared with the case in which all the film layers of the film fabric F are cut using only the laser beam LB. Accordingly, when the position of an edge (the position of a facet) of the release film layer R/F is detected using a vision (camera), the film cutting apparatus 1 may prevent an error from occurring in the detection result due to the shoulder and the taper face T, and thus the polarizing film product manufactured using the film fabric F may be attached to the exact position of the liquid crystal panel.

In general, the laser beam LB may have characteristics in which the amount of energy applied from the laser beam LB decreases towards a film layer positioned far away from a film layer at which an incident point of the laser beam LB is positioned. Thus, when the film fabric F is cut using only the laser beam LB, if output of the laser beam LB is increased to sufficiently supply energy to the film layer positioned far away from the incident point, an excessive amount of energy may be applied to film layers positioned adjacent to the incident point, thus causing thermal deformation. When output of the laser beam LB is lowered to prevent film layers positioned adjacent to the incident point from being thermally deformed, film layers positioned far away from the incident point may not be cut or may be incompletely cut, thereby degrading the cutting quality of the film fabric F. However, the film cutting apparatus 1 may be provided to cut a cutting part of the film fabric F only to a predetermined depth halfway by adjusting the output of the laser beam LB and then to completely cut the cutting part, which is cut halfway, using the cutter 22. The film cutting apparatus 1 may prevent the film fabric F from being thermally deformed due to the laser beam LB and simultaneously may prevent the cutting quality of the film fabric F from being degraded since the film fabric F is not cut or is incompletely cut.

The case in which the film cutting apparatus 1 cuts the film fabric F transferred along a roll path using the laser unit 10 and the cutter unit 20 over two steps has been described, but the present invention is not limited thereto. That is, the film cutting apparatus 1 may be applied to various cases in which multiple films including a plurality of film layers need to be cut.

The present invention may have the following effects.

First, the present invention may be provided to cut other film layers except for a release film layer among all film layers included in a film fabric using a laser beam and a cutter multiply and to cut the release film layer by selectively using the cutter. According to the present invention, an error may be prevented from occurring in a detection result due to a shoulder and a taper face, and thus a polarizing film product manufactured using the film fabric may be attached to the exact position of the liquid crystal panel.

Second, the present invention may be provided to cut a cutting part of a film fabric in half only to a predetermined depth by adjusting output of a laser beam and then to completely cut the cutting part, which is cut in half, using the cutter. According to the present invention, the film fabric may be prevented from being thermally deformed due to the laser beam and simultaneously the cutting quality of the film fabric may be prevented from being degraded since the film fabric is not cut or is incompletely cut.

The above description is merely illustrative of the technical idea of the present disclosure, and it would be obvious to one of ordinary skill in the art that various modifications and variations can be made without departing from the essential features of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection for the present disclosure should be determined based on the following claims, and all technical ideas falling within the scope of equivalents thereto should be interpreted as being included in the scope of the present disclosure.

What is claimed is:

1. A film cutting apparatus for cutting a film fabric having a multilayer structure with a plurality of film layers and including a release film layer positioned at an outermost layer of one side of the film layers, the film cutting apparatus comprising:
   a transferring unit configured to transfer the film fabric in a predetermined transferring direction;
   a laser unit including a laser head configured to form a first cutting line on a predetermined first film group of the film layers by cutting the first film group by selectively irradiating the first film group with a laser beam, wherein the first film group includes some film layers with at least an outermost layer of the other side of the film layers, except for the release film layer; and
   a cutting unit including a cutter configured to form a single cutting line by connecting the first cutting line with a second cutting line on a predetermined second film group of the film layers by cutting the second film group using a cutting blade and a driving motor axially coupled to a rotation shaft of the cutter and configured to rotationally drive the cutter, wherein the second film group includes some film layers with at least the release film layer except for the outermost layer of the other side of the film layers, wherein:
   the laser head is installed to face the outermost layer of the other side of the film layers at a predetermined first cutting point and forms the first cutting line in the transferring direction by radiating a laser beam onto one region of the first film group passing through the first cutting point when the film fabric is transferred in the transferring direction by the transferring unit, such that the first cutting line is formed when the film fabric is transferred by the transferring unit;
   the cutter is installed to face the release film layer at a predetermined second cutting point and forms the second cutting line in the transferring direction by contacting the cutting blade to one region of the second film group passing through the second cutting point when the film fabric is transferred in the transferring direction by the transferring unit, such that the second cutting line is formed when the film fabric is transferred by the transferring unit;
   the second cutting point is determined to be spaced apart from the first cutting point in the transferring direction by a predetermined distance;
   the first film group and the second film group both include at least one film layer, among the film layers, disposed between the outermost layer of the other side and the release film layer; and
   the laser beam and the cutter redundantly cut the at least one film layer and form the first cutting line and the second cutting line, such that the laser unit and the cutting unit form the cutting line.

2. The film cutting apparatus according to claim 1, wherein
   the cutter is configured in a shape of a disk having an outer circumference with the cutting blade formed thereon.

3. The film cutting apparatus according to claim 1, wherein the cutter unit further includes an idle roller configured to support the film fabric passing through the second cutting point.

4. The film cutting apparatus according to claim 1, wherein the cutting line is formed to divide the film fabric into a processed fabric slit to have a predetermined width and scrap as a residue after the film fabric is slit, by a corresponding cutting line.

* * * * *